G. C. OLSON.
WHIP DEVICE FOR LEAD HORSES.
APPLICATION FILED JULY 15, 1914.
1,178,096.
Patented Apr. 4, 1916.
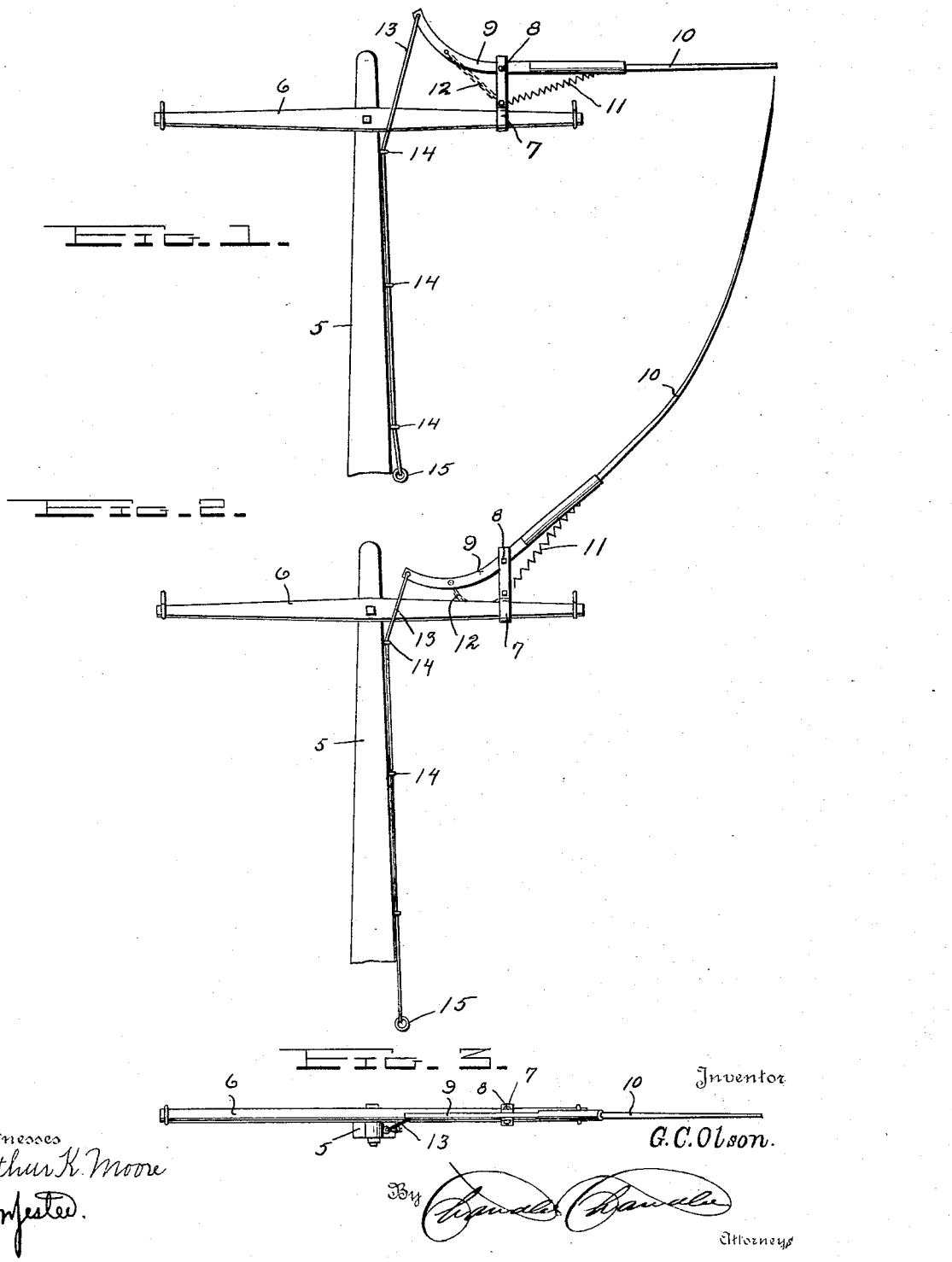

UNITED STATES PATENT OFFICE.

GILBERT C. OLSON, OF LEEDS, NORTH DAKOTA.

WHIP DEVICE FOR LEAD-HORSES.

1,178,096.  Specification of Letters Patent.  Patented Apr. 4, 1916.

Application filed July 15, 1914. Serial No. 851,145.

*To all whom it may concern:*

Be it known that I, GILBERT C. OLSON, a citizen of the United States, residing at Leeds, in the county of Benson, State of North Dakota, have invented certain new and useful Improvements in Whip Devices for Lead-Horses; and I do hereby declare the following to be a full, clear, and exact description of the invention, such as will enable others skilled in the art to which it appertains to make and use the same.

This invention relates to whip-operating devices, and pertains more specially to means for applying the whip to the lead-horses of a four-horse team attached to a machine or vehicle the driver of which is too far in the rear of the lead-team to reach them with a whip in the usual manner.

An important object is the provision of a whip of this character which may be operated from the driver's seat and which will not strike the rear horses.

More specifically the object of the invention resides in the provision of a novel whip device mounted upon the neck yoke of the rear horses and operable from the driver's seat for striking the forward horses.

Another object is the provision of a device of this character which will be extremely simple and inexpensive in manufacture, efficient and durable in use and a general improvement of the art.

With these and other objects and advantages in view, the invention resides in the novel construction and arrangement of parts to be hereinafter more fully described and claimed, and illustrated in the accompanying drawing, in which—

Figure 1 is a plan view of a tongue and neck yoke having my device applied thereto ready for use, Fig. 2 is a similar view showing the device in the act of whipping, and Fig. 3 is a front elevation.

Referring more particularly to the drawing the numeral 5 designates the tongue of an agricultural implement carrying at its forward end the neck yoke 6.

My novel whip operating device comprises a bracket 7 secured upon the neck yoke 6 and bifurcated at its free end as shown at 8. A curved bar 9 is pivoted within the bifurcation 8 and carries at its outer end a whip 10. A coil spring 11 is secured upon the upper end of the bar 9 and is connected with the bracket 7, for normally holding the whip 10 away from the lead-horses. The bar 9 is prevented from being moved too far out of position, by means of a chain 12 secured to the inner end of the bar and the bracket 7.

In order to provide means whereby the bar 9 may be rocked to apply the whip 10 to the lead-horses I provide a cord or wire 13 secured upon the inner end of the bar 9, extending along the tongue 5 through suitable guides 14 and terminating at its end in a loop or handle 15 at the driver's seat.

From the foregoing description and a study of the drawing it will be readily apparent that when the driver desires to urge the lead-horses forward it is merely necessary that he pull upon the handle 15, thereby swinging the inner end of the bar 9 rearwardly and throwing the whip 10 quickly against the lead-horses.

It is to be observed that by this means the driver may readily apply the whip to the lead-horses which could not be reached by an ordinary whip.

It will be readily understood that I reserve the right to make various changes in the form, construction and arrangement of parts without departing from the spirit of the invention or limiting the scope of the subjoined claim.

Having thus described my invention, I claim:

A whip operating device comprising a supporting bar, a bracket on the bar, a whip socket pivoted intermediately to the bracket, one end of said socket being curved forwardly, a coil spring connecting the bracket and socket, a flexible non-elastic connection between the curved end of the socket and bracket for limiting the rearwardly swinging movement of the socket, whereby said socket is normally held parallel with the supporting bar, and means connected to the curved end of the socket for swinging the socket forwardly and at which time the curved end thereof is adjacent the supporting bar.

In testimony whereof, I affix my signature, in the presence of two witnesses.

GILBERT C. OLSON.

Witnesses:
 CLYDE DUFFY,
 J. W. OLESON.

Copies of this patent may be obtained for five cents each, by addressing the "Commissioner of Patents, Washington, D. C."